(12) United States Patent
Rodrigues et al.

(10) Patent No.: US 8,992,087 B2
(45) Date of Patent: Mar. 31, 2015

(54) CRANK DRIVE

(75) Inventors: Alex de Souza Rodrigues, Jarinu (BR); Luis Antonio Fonseca Galli, Campinas (BR); Tavares Walter Oliveira, Jarinu (BR); Stefano Sergio Guerreiro, Sorocaba (BR)

(73) Assignee: Thyssenkrupp Metalurgica Campo Limpo Ltda., Sao Paolo (BR)

( * ) Notice: Subject to any disclaimer, the term of this patent is extended or adjusted under 35 U.S.C. 154(b) by 0 days.

(21) Appl. No.: 14/003,983

(22) PCT Filed: Mar. 5, 2012

(86) PCT No.: PCT/IB2012/000423
§ 371 (c)(1),
(2), (4) Date: Oct. 25, 2013

(87) PCT Pub. No.: WO2012/120362
PCT Pub. Date: Sep. 13, 2012

(65) Prior Publication Data
US 2014/0050429 A1    Feb. 20, 2014

(30) Foreign Application Priority Data

Mar. 7, 2011    (DE) .................... 10 2011 013 264

(51) Int. Cl.
*F16C 33/02*     (2006.01)
*F16C 33/24*     (2006.01)
(Continued)

(52) U.S. Cl.
CPC .... *F16C 9/02* (2013.01); *F16C 9/04* (2013.01)
USPC ............ 384/294; 384/276; 384/280; 384/429

(58) Field of Classification Search
CPC ...... F16C 11/0661; F16C 23/02; F16C 23/04; F16C 23/043; F16C 23/045; F16C 9/02; F16C 9/04
USPC ............ 74/595; 384/192, 206, 215, 238, 276, 384/280, 281, 294, 429
See application file for complete search history.

(56) References Cited

U.S. PATENT DOCUMENTS

| | | |
|---|---|---|
| 1,124,282 A | 1/1915 | Bragassa |
| 1,716,062 A | 6/1929 | Johnson |

(Continued)

FOREIGN PATENT DOCUMENTS

| | | |
|---|---|---|
| DE | 1261704 B | 2/1968 |
| DE | 2223721 A1 | 6/1973 |

(Continued)

*Primary Examiner* — Alan B Waits
(74) *Attorney, Agent, or Firm* — Laurence A. Greenberg; Werner H. Stemer; Ralph E. Locher

(57) ABSTRACT

A crank drive includes a crankshaft journal having a concave-shaped surface, a bearing element in which the crankshaft journal is rotatably mounted, and a bearing shell disposed between the crankshaft journal and the bearing element and having a first convex-shaped surface matched with the concave-shaped surface of the crankshaft journal. The bearing shell has a second surface associated with the bearing element and is constructed such that the bearing shell has a non-constant cross section in the longitudinal direction of the crankshaft journal. The bearing element surface facing the bearing shell is adapted to the second surface of the bearing shell regarding the shape of the bearing element surface, and the second surface of the bearing shell is cylindrical or concave and has a smaller curvature than the concave-shaped surface of the crankshaft journal.

1 Claim, 2 Drawing Sheets

(51) Int. Cl.
  *F16C 9/02*  (2006.01)
  *F16C 35/00* (2006.01)
  *F16C 9/04*  (2006.01)

(56) References Cited

U.S. PATENT DOCUMENTS

| | | | |
|---|---|---|---|
| 1,931,231 A | | 10/1933 | Luker |
| 4,319,496 A | * | 3/1982 | Yanaga .................. 74/473.37 |
| 4,732,493 A | * | 3/1988 | Bonello .................... 384/243 |
| 6,089,755 A | * | 7/2000 | Okamoto et al. ............ 384/276 |
| 8,308,368 B2 | * | 11/2012 | Blair et al. .................... 384/418 |
| 2008/0302207 A1 | | 12/2008 | Breidenbach et al. |
| 2010/0083791 A1 | | 4/2010 | Guerreiro et al. |

FOREIGN PATENT DOCUMENTS

| | | |
|---|---|---|
| DE | 10130253 A1 | 1/2003 |
| DE | 102007026371 A1 | 12/2008 |
| GB | 1380947 | 1/1975 |
| JP | H02109009 U | 8/1990 |
| WO | 2008129395 A2 | 10/2008 |

* cited by examiner

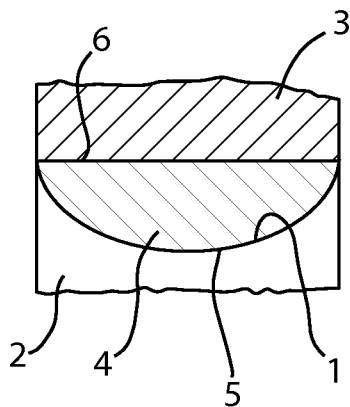
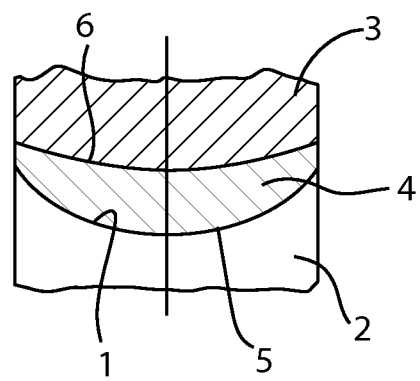
FIG. 1A  FIG. 2A
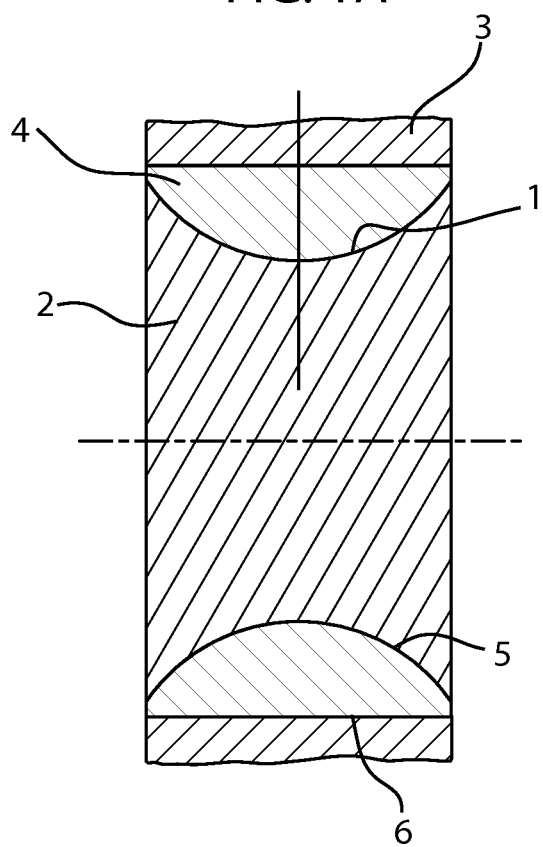
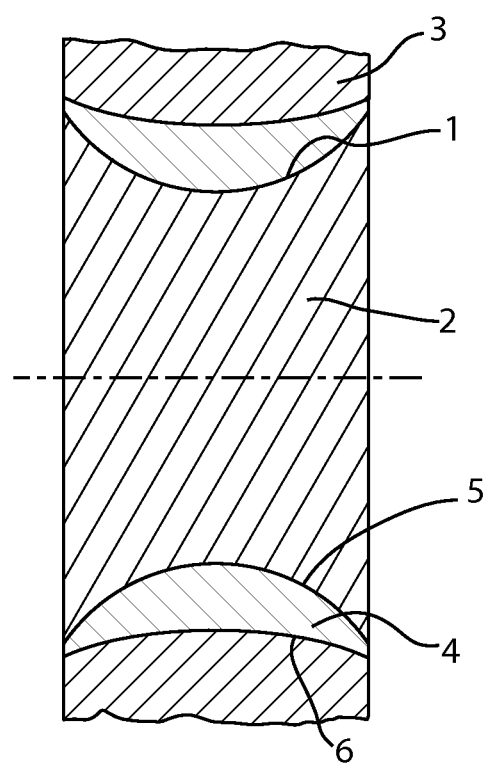
FIG. 1B  FIG. 2B

CRANK DRIVE

BACKGROUND OF THE INVENTION

Field of the Invention

The invention relates to a crank drive having a crankshaft journal with a concave-shaped surface, a bearing element, in which the crankshaft journal is rotatably mounted, and a bearing shell, which is arranged between the crankshaft journal and the bearing element and which has a convex-shaped first surface, which is associated with the concave-shaped surface of the crankshaft journal.

The crankshaft journal can be a crank journal of a crankshaft, on which the large connecting rod eye of a connecting rod is mounted. In this case the connecting rod or its large connecting rod eye forms the bearing element within the meaning of the present invention. The crankshaft journal can however also be a main bearing journal of the crankshaft, by means of which the crankshaft is mounted rotatably in a bearing receptacle of the engine housing. In this case the bearing receptacle of the engine housing forms the bearing element within the meaning of the present invention.

In many crank drives known from the prior art, the crankshaft journal is cylindrical, and a hollow cylindrical bearing shell is arranged between the crankshaft journal and the bearing element, which bearing shell has a constant wall thickness as viewed over its width. This hollow cylindrical bearing shell thus has a constant circular cross section over its axial extent.

A crank drive consisting of a non-cylindrical, concave-shaped crank journal of a crankshaft and a connecting rod mounted rotatably thereon with its large connecting rod eye is known from international patent application WO 2008/129395 A2. With this known crank drive, the crank journal has a concave-shaped surface, and the surface of the large connecting rod eye which faces the crank journal is correspondingly convex-shaped, so the two mutually facing surfaces are matched to each other. According to a preferred embodiment of the invention disclosed in WO 2008/129395 A2, the large connecting rod eye is mounted on the crank journal, i.e. without interposition of a bearing shell. Furthermore, an embodiment is mentioned in the general description part of WO 2008/129395 A2, with which a bearing shell is arranged between the crank journal and the large connecting rod eye. In this embodiment with the bearing shell, the surface of the large connecting rod eye facing the crank journal is also matched to the concave shape of the crank journal surface.

Thus, the WO 2008/129395 A2 gives a person skilled in the art the technical teaching that the convex curvature of the surface of the large connecting rod eye must run in exactly the same way as the concave curvature of the crank journal. It is therefore necessary to give the inner bearing face of the large connecting rod eye, which interacts with the crank journal, a convex shape corresponding to the concave shape of the crank journal by means of machine-cutting. In the process, considerable measurement demands must be met to achieve the exact precision of shape necessary for the sliding bearing of the connecting rod on the crank journal. The creation of such a convex shape on the large connecting rod eye with the precision necessary for the bearing of the connecting rod on the crank journal while complying with the necessary tolerances is therefore complex in manufacturing terms. The production costs for such connecting rods are therefore comparatively high, so the production costs for crank drives equipped with such connecting rods are also high.

A further disadvantage of the solution known from WO 2008/129395 A2 can be seen in that, because the bearing face of the large connecting rod eye matches the concave shape of the surface of the crank journal for a crankshaft with a given concave crank journal surface, only one single concrete connecting rod ever fits. Therefore, only one single crank drive design is possible. In the case of this known solution, it is not possible to combine different connecting rods with a certain specified crankshaft and in this manner allow the designer greater flexibility when designing the crank drive.

BRIEF SUMMARY OF THE INVENTION

The invention is based on the object of providing a crank drive according to the invention, which is simple to manufacture and comparatively inexpensive to produce. It should also be possible to provide crank drives of different designs in a simple manner on the basis of a certain, specified crankshaft design.

This object is achieved by a crank drive having the following features:

The invention emanates from a crank drive having a crankshaft journal with a concave-shaped surface, a bearing element, in which the crankshaft journal is rotatably mounted, and a bearing shell, which is arranged between the crankshaft journal and the bearing element and which has a convex-shaped first surface, which is associated with the concave-shaped surface of the crankshaft journal. To achieve the possibility of combining different bearing elements for differently designed crank drives with one and the same crank shaft, it is proposed according to the invention for the bearing shell to have a second surface, which is associated with the bearing element and which is designed in such a manner that the bearing shell has a non-constant cross section as seen in the longitudinal direction of the crankshaft journal, and that the surface of the bearing element which faces the bearing shell is matched in shape to the second surface of the bearing shell, and wherein in particular the second surface of the bearing shell is cylindrical or concave and has a smaller curvature than the concave-shaped surface of the crankshaft journal. In this manner it is no longer necessary to match the shape of the surface of the bearing element which faces the crankshaft journal to the concave-shaped surface of the crankshaft journal. The simple replacement of a first bearing shell having a particular surface facing the bearing element with a second bearing shell having a differently designed surface facing the bearing element means that differently designed bearing elements can be used simply and inexpensively for one and the same crankshaft, to produce different crank drives.

The fact that the second surface of the bearing shell which is associated with the bearing element is formed in such a manner that the bearing shell cross section has a non-constant cross section as seen in the longitudinal direction of the crankshaft journal, i.e. over the bearing shell width, means that the surface of the bearing shell which faces away from the crankshaft journal and is associated with the bearing element can have a shape which is either not curved (and therefore has a cylindrical shape), or the curvature of which is much smaller than the curvature of the surface of the bearing shell which is associated with the crankshaft journal. This achieves the possibility of forming the bearing face of the bearing element which faces the bearing shell either cylindrically or else at least with a less distinctive convex shape having a curvature which is much smaller than it would have to be if the said bearing face of the bearing element had to be matched in shape to the concave surface of the crankshaft journal.

Therefore, the invention provides the designer the freedom to design the shape of the surface of the bearing element which faces the crankshaft journal completely independent from the shape of the surface of the crankshaft journal. The bearing element can therefore be produced with much less effort in manufacturing terms. Complex measurements with expensive measuring instruments for complying with the necessary shape of the bearing face of the bearing element are omitted completely or can be carried out with much less effort and simpler measuring instruments. The production costs for the bearing element of the crank drive according to the invention can thereby be greatly reduced compared to the solution known from WO 2008/129395 A2.

According to a first possible embodiment of the invention, the second surface of the bearing shell is formed cylindrical. Both the bearing shell and the bearing element can in this case be produced inexpensively and particularly simple in manufacturing terms. In this embodiment of the invention, the recess of the bearing element which accommodates the bearing shell can be designed as a simple cylindrical recess, for example a simple cylindrical bore. If the bearing element is e.g. a connecting rod having a large connecting rod eye, then a simple cylindrical bore suffices to accommodate the bearing shell and to rotatably mount the crankshaft journal with the concave surface. Strict shape and tolerance limits do not have to be observed during manufacturing, as would be necessary if the surface of the large connecting rod eye which faces the crankshaft journal had to be matched to the concave shape of the crankshaft journal. A simple, coarse machine-cutting of the inner surface of the cylindrical bore of the bearing element is sufficient. The matching of the first, convex-shaped surface of the bearing shell which faces the crankshaft journal to the concave-shaped surface of the crankshaft journal is much simpler and more cost-effective in manufacturing terms than the matching of the surface of the bearing element which faces the crankshaft journal. The complex "bearing element" component can thus be designed to be simple and easy to produce without the advantages of a concave/convex-shaped pair of bearing faces on the crankshaft journal. The bearing shell is much smaller than the bearing element, so it is simpler to process or machine. Moreover, the bearing shell is axially symmetrical and has a much more uniform distribution of mass than e.g. a bearing element formed as a connecting rod. The convex first surface of the bearing shell does not have to be produced by machine-cutting, as would be the case with a more complex bearing element, but can also be produced using other different production methods such as pressing, casting, sintering or forging.

According to a second possible embodiment of the invention, the second surface of the bearing shell is formed concave, the curvature of this second surface of the bearing shell being smaller than the curvature of the concave surface of the crankshaft journal. This achieves the situation in which the surface of the bearing element which faces the crankshaft journal at least does not have to be as greatly curved as would be necessary if the surface of the bearing element which faces the crankshaft journal had to be matched to the concavely curved surface of the crankshaft journal. Also in this embodiment of the invention, the advantage that the bearing element can be produced inexpensively and with comparatively little manufacturing effort, is retained.

Common to both the above-described embodiments of the invention is that the manufacturing effort for the actual bearing element, that is, the connecting rod having the large connecting rod eye or the bearing element of the engine housing which accommodates the main bearing journal of a crankshaft, can be produced with much less effort in manufacturing and measurement terms, as a result of which production costs can be greatly reduced. It is much less complex in manufacturing terms and therefore also much more cost-effective to match only the bearing shell with its first surface which faces the crankshaft journal to the concave shape of the crankshaft journal than to match the bearing face, which faces the crankshaft journal, of the bearing element itself to the concave shape of the crankshaft journal. The step of matching the shape of the bearing face of the bearing element to the concave-shaped surface of the crankshaft bearing, which increases production costs and manufacturing effort, is thus according to the invention shifted away from the bearing element into the bearing shell. The advantages of mounting the bearing element on a crankshaft journal having a concave-shaped bearing surface and the simple design of the bearing element with a cylindrical or only slightly curved convex bearing face can be combined with each other by the invention and utilised at the same time.

BRIEF DESCRIPTION OF THE SEVERAL VIEWS OF THE DRAWING

The invention is explained in more detail below using a schematic drawing. It is shown;

FIG. 1*a* an embodiment of the invention having a bearing element configured as a connecting rod, wherein the connecting rod is mounted with its large connecting rod eye on a crank journal of a crankshaft, in a section showing only one part of the crank drive;

FIG. 1*b* an embodiment of the invention in which the crankshaft journal is configured as a main bearing journal of a crankshaft, having a bearing shell comparable to FIG. 1*a*, in a section showing only one part of the crank drive;

FIG. 2*a* an embodiment of the invention having a bearing element which is configured as a connecting rod and is mounted with its large connecting rod eye on a crank journal of a crankshaft, in an embodiment of the invention which is modified with respect to FIG. 1*a* and likewise in a section showing only one part of the crank drive;

FIG. 2*b* an embodiment of the invention which is modified with respect to FIG. 1*b*, having a bearing shell according to the invention which is arranged on a main bearing journal of a crankshaft, in a section showing only one part of the crank drive;

DESCRIPTION OF THE INVENTION

Figure 3:
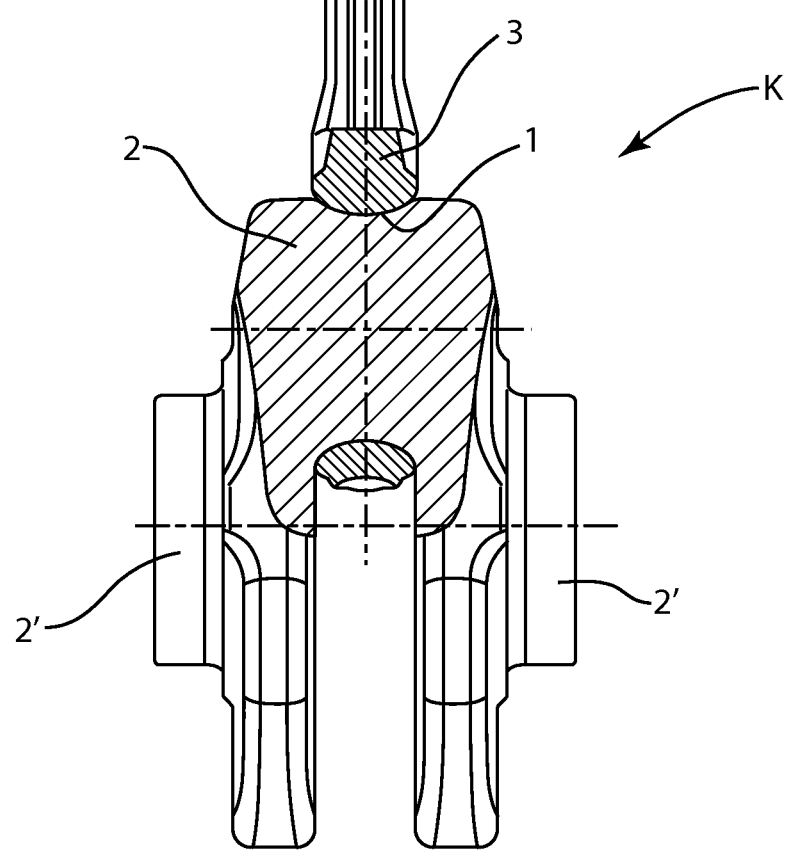
FIG. 3*a* crank drive according to the prior art.

FIG. 3 shows a crank drive K known from the prior art according to WO 2008/129395 A2, using the example of a bearing element 3 mounted on a crankshaft journal 2. The bearing element 3 is configured as a connecting rod. The bearing face 1 of the crankshaft journal 2 which faces the bearing element 3 has a concave shape. The surface of the bearing element 3 which faces the said bearing face 1 has a convex shape, which is matched to the concave shape of the bearing face 1 of the crankshaft journal 2. In the embodiment shown in FIG. 3, which is the preferred embodiment according to WO 2008/129395 A2, there is no bearing shell arranged between the bearing element 3 and the crankshaft journal 2. However, in the description of WO 2008/129395 A2 it is mentioned that a bearing shell can be arranged between the bearing element 3 and the crankshaft journal 2. The present invention proceeds from this exemplary embodiment mentioned only briefly in the description of WO 2008/129395 A2. The main bearing journals of the crank drive K are referred to with 2'.

FIGS. 1*a* and 1*b* show a first embodiment of the present invention in a schematic diagram which shows only one section of the crank drive according to the invention. According to this first embodiment of the invention, the bearing shell 4, which is arranged between the crankshaft journal 2 and the bearing element 3, is formed with a non-constant cross section over the longitudinal extent of the crankshaft journal 2 (that is, as seen parallel to the drawing plane). In the subject matter shown in FIG. 1a, the crankshaft journal 2 is formed as an eccentrically arranged crank journal of a crankshaft (not shown in detail). The bearing element 3 is configured as a connecting rod, which is mounted with its large connecting rod eye on the crank journal 2. Similarly, in FIG. 1b, the crankshaft journal 2, which is configured as a main bearing journal on a crankshaft (not shown in detail), is mounted in a bearing element 3 by means of a bearing shell 4. In the exemplary embodiment shown in FIG. 1b, the bearing element 3 is a bearing receptacle which is connected fixedly to an engine housing of an internal combustion engine (not shown) for the rotatable accommodation of the main bearing journal of the crankshaft.

Both in FIG. 1a and in FIG. 1b, the bearing element 4 has a non-constant cross-sectional profile as seen in the longitudinal direction of the crankshaft journal 2, that is, parallel to the drawing plane. The bearing shell 4 has a convex-shaped first surface 5, which is associated with the concave-shaped surface 1 of the crankshaft journal 2. The first surface 5 of the bearing shell 4 is matched in shape to the concave-shaped surface 1 of the crankshaft journal 2. The bearing element 3 has a cylindrical recess, which is configured as a bore, in which the cylindrical second surface 6 of the bearing shell 4 is accommodated. In this manner the possibility is achieved of producing the bearing element 3 with little effort in manufacturing and measurement terms without having to observe particular shape specifications and tolerances during production of the bearing element 3.

In the embodiments of the invention shown in FIGS. 1a and 1b, it is merely necessary to provide a cylindrical recess, for example in the form of a cylindrical bore, in the bearing element 3 in order to accommodate the cylindrical, outer, second surface 6 of the bearing shell 4. The step of producing a convex surface 5 matched to the concave-shaped surface 1 of the crankshaft journal 2, which is more complex in manufacturing terms, is shifted away from the bearing element 3 and towards the bearing shell 4 in the invention. The production of the convex-shaped first surface 5 can be realised much more simply, with less effort and lower costs with the production of the comparatively small bearing element 4. The substantially larger and more complex component, namely the bearing element 3, only has to be provided with a simple cylindrical recess.

In this manner the present invention makes it possible for only a cylindrical recess to have to be provided on a complex component of the crank drive, namely the bearing element 3, so the said complex component can be produced simply and inexpensively. At the same time, the advantages associated with the mounting of the bearing element on a concave-shaped surface of the crankshaft journal are retained. These advantages are described in detail in the document WO 2008/129395 A2.

A second embodiment of the invention is shown in FIGS. 2a and 2b. In FIG. 2a, the bearing element 3 is configured as a connecting rod. This connecting rod is mounted with its large connecting rod eye on a crankshaft journal 2 of a crankshaft (not shown in detail) with interposition of a bearing shell 4. In the subject matter of FIG. 2b, however, the crankshaft journal 2 is configured as a main bearing journal of a crankshaft (not shown in detail), the crankshaft journal 2 being accommodated rotatably in a bearing receptacle with inter-position of a bearing shell 4. The said bearing receptacle is connected fixedly to an engine housing (not shown) and forms the bearing element 3.

Both in the embodiment of FIG. 2a and the embodiment of FIG. 2b, the crankshaft journal 2 has a concave-shaped surface 1. The bearing shell 4 arranged between the bearing element 3 and the crankshaft journal 2 has a first convex-shaped surface 5, which faces the crankshaft journal. The convex-shaped surface 5 is matched in shape to the concave-shaped surface 1 of the crankshaft journal 2.

The bearing shell 4 has a second concave-shaped surface 6 on the side facing away from the crankshaft journal 2. This second, concave-shaped surface 6 has a substantially less pronounced curvature than the curvature of the concave-shaped surface 1 of the crankshaft journal 2. Accordingly, the surface of the bearing element 3 which faces the second surface 6 of the bearing shell 4 also has a much smaller curvature than would be necessary if it had to be matched to the concave-shaped surface 1 of the crankshaft journal 2. The curvature of the second, concave-shaped surface 6 of the bearing shell 4 therefore defines the curvature of the convex-shaped bearing face of the bearing element 3 which faces the bearing shell 4. For this reason, the shape of this convex-shaped bearing face of the bearing element can be designed completely independently from the concave-shaped bearing face of the crankshaft journal 2.

The fact that in the embodiment of the invention according to FIGS. 2a and 2b—as in the first embodiment according to FIGS. 1a and 1b—the cross section of the bearing shell 4 does not have a constant profile in the direction of the longitudinal extent of the crankshaft journal 2, that is, as seen parallel to the drawing plane, means that the surface of the bearing element 3 which faces the bearing shell 4 can be much less curved than would be necessary if the bearing shell 4 had a constant cross section in the direction of the longitudinal extent of the crankshaft journal 2. Then the curvature of the surface of the bearing element 3 which faces the crankshaft journal 2 would have to be matched in curvature to the concave-shaped surface 1 of the crankshaft journal 2.

In the embodiment according to FIGS. 2a and 2b, benefits can be gained from the advantages of the larger contact face between the bearing element 3 and the bearing shell 4, while at the same time less manufacturing effort is retained for the production of the bearing element 3, because the much smaller curvature of the surface of the bearing element 3 which faces the bearing shell 4 requires much less effort in measurement and manufacturing terms than the production of a highly curved convex surface complying with the shape and measurement tolerances necessary for the application.

Common to both the above-described embodiments of the invention is that a very flexible crank drive is provided. For example different connecting rods can be combined with one and the same crankshaft, it only being necessary for differently designed bearing shells 4 to be arranged between the crankshaft journal and the large connecting rod eye of the connecting rod. Similarly, differently shaped bearing brackets can be used to accommodate the main bearing journals of one and the same crankshaft, it only being necessary for correspondingly arranged bearing shells 4 to be arranged between the crankshaft main bearing journal and the bearing bracket. In this manner, bearing elements which are optimally matched to the actual application can easily be combined with one and the same crankshaft. It is also possible to use one and the same crankshaft in different engine housings with differently designed bearing brackets for accommodating the crankshaft.

The above-mentioned advantages are of great importance in practice. The bearing geometry, that is, the geometries of the bearing faces in functional connection with each other, can be optimised with the invention with respect to the application, for example with respect to dynamic behaviour of the bearing partners, lubrication of the bearing, process parameters during engine operation etc. This can be utilised e.g. with respect to the very different pressure levels at which engines are operated. For instance, very different pressures arise during operation in petrol engines and diesel engines. The pressures arising during operation are much greater in diesel engines than in petrol engines. Therefore, for example, the demands on the bearing of the connecting rods on the crank journal of the crankshaft or on the bearing of the crankshaft main journal in the engine housing are also different in diesel engines and petrol engines, so the respective bearings must be designed differently to achieve the necessary service life of the crank drive in each case. The present invention now makes it possible to use one and the same crankshaft in different engines, despite these different demands, since the necessary differences with respect to the design of the bearings are realised according to the invention by the use of a bearing shell which is adapted to the application together with a connecting rod which is matched to the bearing shell.

The bearing shell solution according to the invention provides the designer with greater flexibility with respect to application-related adaptation and optimisation processes.

The pair of bearing faces between the bearing element 3 and the bearing shell 4 can be designed differently in a simple manner, without the layout and design of the crankshaft itself having to be changed.

The invention claimed is:

1. A crank drive for an internal combustion engine, comprising:
    a bearing element;
    a crankshaft journal having a concave-shaped surface, said crankshaft journal being rotatably mounted in said bearing element;
    a bearing shell disposed between said crankshaft journal and said bearing element;
    said bearing shell having a convex-shaped first surface associated with said concave-shaped surface of said crankshaft journal;
    said bearing shell having a second surface associated with said bearing element and constructed to provide said bearing shell with a non-constant cross section in longitudinal direction of said crankshaft journal;
    said bearing element having a surface facing said bearing shell being matched in shape to said second surface of said bearing shell; and
    said second surface of said bearing shell being concave and having a smaller curvature than said concave-shaped surface of said crankshaft journal.

* * * * *